(12) United States Patent
Sinha et al.

(10) Patent No.: US 12,119,022 B2
(45) Date of Patent: Oct. 15, 2024

(54) COGNITIVE ASSISTANT FOR REAL-TIME EMOTION DETECTION FROM HUMAN SPEECH

(71) Applicants: Rishi Amit Sinha, San Jose, CA (US); Ria Sinha, San Jose, CA (US)

(72) Inventors: Rishi Amit Sinha, San Jose, CA (US); Ria Sinha, San Jose, CA (US)

(*) Notice: Subject to any disclaimer, the term of this patent is extended or adjusted under 35 U.S.C. 154(b) by 479 days.

(21) Appl. No.: 17/536,673

(22) Filed: Nov. 29, 2021

(65) Prior Publication Data
US 2022/0084543 A1    Mar. 17, 2022

Related U.S. Application Data

(63) Continuation-in-part of application No. 16/747,697, filed on Jan. 21, 2020, now Pat. No. 11,189,265.

(51) Int. Cl.
*G10L 25/63* (2013.01)
*G10L 21/0208* (2013.01)
(Continued)

(52) U.S. Cl.
CPC .......... *G10L 25/63* (2013.01); *G10L 21/0208* (2013.01); *G10L 25/30* (2013.01); *H04L 67/55* (2022.05)

(58) Field of Classification Search
CPC . A61H 19/00; G06F 16/5838; G06F 16/9535; G06F 17/16; G06F 21/554; G06F 40/35; G06F 3/015; G06F 17/153; G06F 40/211; G06F 40/253; G06N 3/044; G06N 3/08; G06N 20/00; G06Q 30/0269; G06Q 10/06375; G06V 10/764; G06V 10/82; G06V 40/165; G06V 20/64; G08B 25/016; G09B 21/009; G09B 5/065; G09B 19/00;
(Continued)

(56) References Cited

U.S. PATENT DOCUMENTS 5,796,328 A    8/1998  Golant
9,940,801 B2   4/2018  Phillips
(Continued)

OTHER PUBLICATIONS

World Health Organization: WHO. (Mar. 20, 2019). Deafness and hearing loss. https://www.who.int/news-room/fact-sheets/detail/deafness-and-hearing-loss.
(Continued)

*Primary Examiner* — Gerald Gauthier
(74) *Attorney, Agent, or Firm* — Baratta Law PLLC; Lawrence A. Baratta, Jr.

(57) ABSTRACT

Systems and methods used in a cognitive assistant for detecting human emotions from speech audio signals is described. The system obtains audio signals from an audio receiver and extracts human speech samples. Subsequently, it runs a machine learning based classifier to analyze the human speech signal and classify the emotion observed in it. The user is then notified, based on their preferences, with a summary of the emotion detected. Notifications can also be sent to other systems that have been configured to receive them. Optionally, the system may include the ability to store the speech sample and emotion classification detected for future analysis. The system's machine learning classifier is periodically re-trained based on labelled audio speech data and updated.

13 Claims, 12 Drawing Sheets

(51) Int. Cl.
  *G10L 25/30* (2013.01)
  *H04L 67/55* (2022.01)
(58) Field of Classification Search
  CPC ......... G10L 13/10; G10L 14/24; G10L 15/01;
      G10L 15/04; G10L 15/1815; G10L 15/22;
      G10L 15/26; G10L 15/30; G10L 17/26;
      G10L 19/018; G10L 21/0208; G10L
      25/30; G10L 25/63; G10L 25/66; G10L
      25/78; G10L 2021/065; G10L 15/16;
      G10L 15/24; G10L 25/27; H04L 67/55;
      H04M 1/72448; H04N 7/15; H04N
      21/233; H04N 21/44218; H04R 3/04;
      H04R 5/04; H04R 25/558; H04R
      2205/041; H04R 2225/43; H04R 2225/55;
      H04R 2430/01; A61B 5/6803
  See application file for complete search history.

(56) References Cited

U.S. PATENT DOCUMENTS

| | | | | |
|---|---|---|---|---|
| 10,127,825 B1* | 11/2018 | Nguyen | | G09B 5/065 |
| 10,367,931 B1* | 7/2019 | Nguyen | | A61B 5/6803 |
| 10,600,408 B1* | 3/2020 | Smith | | G10L 13/10 |
| 10,854,191 B1* | 12/2020 | Geramifard | | G10L 15/01 |
| 10,896,428 B1* | 1/2021 | Balasubramaniam | | G10L 15/1815 |
| 10,904,669 B1 | 1/2021 | Talakoub et al. | | |
| 10,905,337 B2 | 2/2021 | Tran | | |
| 11,043,230 B1* | 6/2021 | Riding | | G06Q 30/0269 |
| 11,252,374 B1* | 2/2022 | Lichtenberg | | H04N 7/15 |
| 11,270,078 B2* | 3/2022 | Cleverley | | G06F 40/253 |
| 12,067,892 B1* | 8/2024 | Bridges | | G09B 19/00 |
| 2007/0162283 A1* | 7/2007 | Petrushin | | G10L 17/26 704/255 |
| 2011/0161076 A1* | 6/2011 | Davis | | H04M 1/72448 704/E15.001 |
| 2011/0295607 A1* | 12/2011 | Krishnan | | G10L 17/26 704/E11.001 |
| 2013/0297297 A1* | 11/2013 | Guven | | G10L 25/63 704/204 |
| 2014/0257820 A1* | 9/2014 | Laperdon | | G10L 25/63 704/270 |
| 2016/0019915 A1* | 1/2016 | Khan | | G10L 19/018 704/239 |
| 2016/0162807 A1* | 6/2016 | Smailagic | | G06N 20/00 706/12 |
| 2017/0206915 A1* | 7/2017 | Prasad | | G10L 25/63 |
| 2017/0316312 A1* | 11/2017 | Goyal | | G06F 17/16 |
| 2017/0344880 A1* | 11/2017 | Nekuii | | G06F 17/153 |
| 2018/0053503 A1* | 2/2018 | Ogunyoku | | G08B 25/016 |
| 2018/0277100 A1 | 9/2018 | Cassagne et al. | | |
| 2018/0308476 A1* | 10/2018 | Hirzel | | G06F 40/211 |
| 2019/0237096 A1* | 8/2019 | Trella | | G06F 21/554 |
| 2019/0341026 A1* | 11/2019 | Visser | | G10L 25/63 |
| 2019/0392055 A1* | 12/2019 | Rose | | G06F 16/5838 |
| 2020/0035247 A1 | 1/2020 | Boyadjiev et al. | | |
| 2020/0051582 A1* | 2/2020 | Gilson | | H04N 21/233 |
| 2020/0075040 A1* | 3/2020 | Provost | | G06N 3/044 |
| 2020/0126545 A1* | 4/2020 | Kakkar | | G06V 10/764 |
| 2020/0152179 A1* | 5/2020 | van Hout | | G10L 15/22 |
| 2020/0152304 A1* | 5/2020 | Chang | | G10L 25/63 |
| 2020/0160881 A1 | 5/2020 | Gadgil et al. | | |
| 2020/0252510 A1* | 8/2020 | Ghuge | | G10L 15/26 |
| 2020/0268260 A1 | 8/2020 | Tran | | |
| 2020/0279553 A1* | 9/2020 | McDuff | | G10L 25/78 |
| 2020/0304934 A1 | 9/2020 | Yu | | |
| 2020/0349429 A1* | 11/2020 | Vendrow | | H04N 7/15 |
| 2020/0380979 A1 | 12/2020 | Meacham et al. | | |
| 2021/0012065 A1* | 1/2021 | Shmuel | | G06F 40/35 |
| 2021/0020191 A1 | 1/2021 | Venneti et al. | | |
| 2021/0027893 A1 | 1/2021 | Nematihosseinabadi et al. | | |
| 2021/0035422 A1 | 2/2021 | Sherman | | |
| 2021/0042507 A1* | 2/2021 | Raviv | | G06V 40/165 |
| 2021/0050033 A1* | 2/2021 | Bui | | G06F 17/16 |
| 2021/0064680 A1* | 3/2021 | Maheshwari | | G06F 16/9535 |
| 2021/0090576 A1* | 3/2021 | Salazar | | G10L 25/66 |
| 2021/0090592 A1* | 3/2021 | Lee | | G10L 15/26 |
| 2021/0110812 A1 | 4/2021 | Naylor-Teece et al. | | |
| 2021/0118426 A1* | 4/2021 | Li | | G10L 15/04 |
| 2021/0125608 A1* | 4/2021 | Weir | | G10L 15/22 |
| 2021/0158845 A1* | 5/2021 | Sethi | | G06V 10/82 |
| 2021/0192332 A1* | 6/2021 | Gangotri | | G10L 15/30 |
| 2021/0192412 A1* | 6/2021 | Krishnaswamy | | G06Q 10/06375 |
| 2021/0211768 A1* | 7/2021 | Zhong | | H04N 21/44218 |
| 2021/0225365 A1* | 7/2021 | Sinha | | H04R 3/04 |
| 2021/0287014 A1* | 9/2021 | Colachis | | G06V 20/64 |
| 2021/0306173 A1* | 9/2021 | Krikunov | | G06F 3/015 |
| 2022/0084543 A1* | 3/2022 | Sinha | | H04R 25/558 |
| 2022/0301563 A1* | 9/2022 | Chang | | G10L 15/24 |
| 2022/0323290 A1* | 10/2022 | Sloan | | A61H 19/00 |
| 2023/0260533 A1* | 8/2023 | Farrell | | G10L 25/27 704/231 |

OTHER PUBLICATIONS

WebMD. (May 14, 2012). Treatments for Hearing Loss. https://www.webmd.com/a-to-z-guides/hearing-loss-treatment-options.
National Institute on Deafness and Other Communication Disorders: NIDCD. (Nov. 12, 2019). Assistive Devices for People with Hearing, Voice, Speech, or Language. https://www.nidcd.nih.gov/health/assistive-devices-people-hearing-voice-speech-or-language-disorders.
Department of Health (2005). Mental health and deafness—Towards equity and access: Best practice guidance. London, UK: HMSO.
Hearing Loss Association of America: HLAA. (2019). Types, Causes and Treatments, https://www.hearingloss.org/hearing-help/hearing-loss-basics/types-causes-and-treatment/.
National Institute on Deafness and Other Communication Disorders: NIDCD. (Jun. 15, 2018). Hearing Aids. https://www.nidcd.nih.gov/health/hearing aids.
Rains, T. (Sep. 13, 2019). How much do hearing aids cost? https://www.consumeraffairs.com/health/hearing-aid-cost.html.
Wikipedia. (Nov. 24, 2019b). Cochlear implant. https://en.wikipedia.org/wiki/Cochlear_implant.
Gallaudet University and Clerc Center. (2019). Assistive Technologies for Individuals Who are Deaf or Hard of Hearing. https://www3.gallaudet.edu/clerc-center/info-to-go/assistive-technology/assistive-technologies.html.
Apple. (Sep. 19, 2019). Use Live Listen with Made for iPhone hearing aids. https://support.apple.com/en-us/ HT203990.
Gemmeke, J. (2017). Audio Set: An ontology and human-labeled dataset for audio events. https://research.google.com/audioset/.
Salamon, J. et al., (2014). A Dataset and Taxonomy for Urban Sound Research. https://urbansounddataset.weebly.com/.
Fonseca, E. (2019). Freesound Datasets: A Platform for the Creation of Open Audio Datasets. https://annotator.freesound.org/fsd/explore/.

* cited by examiner

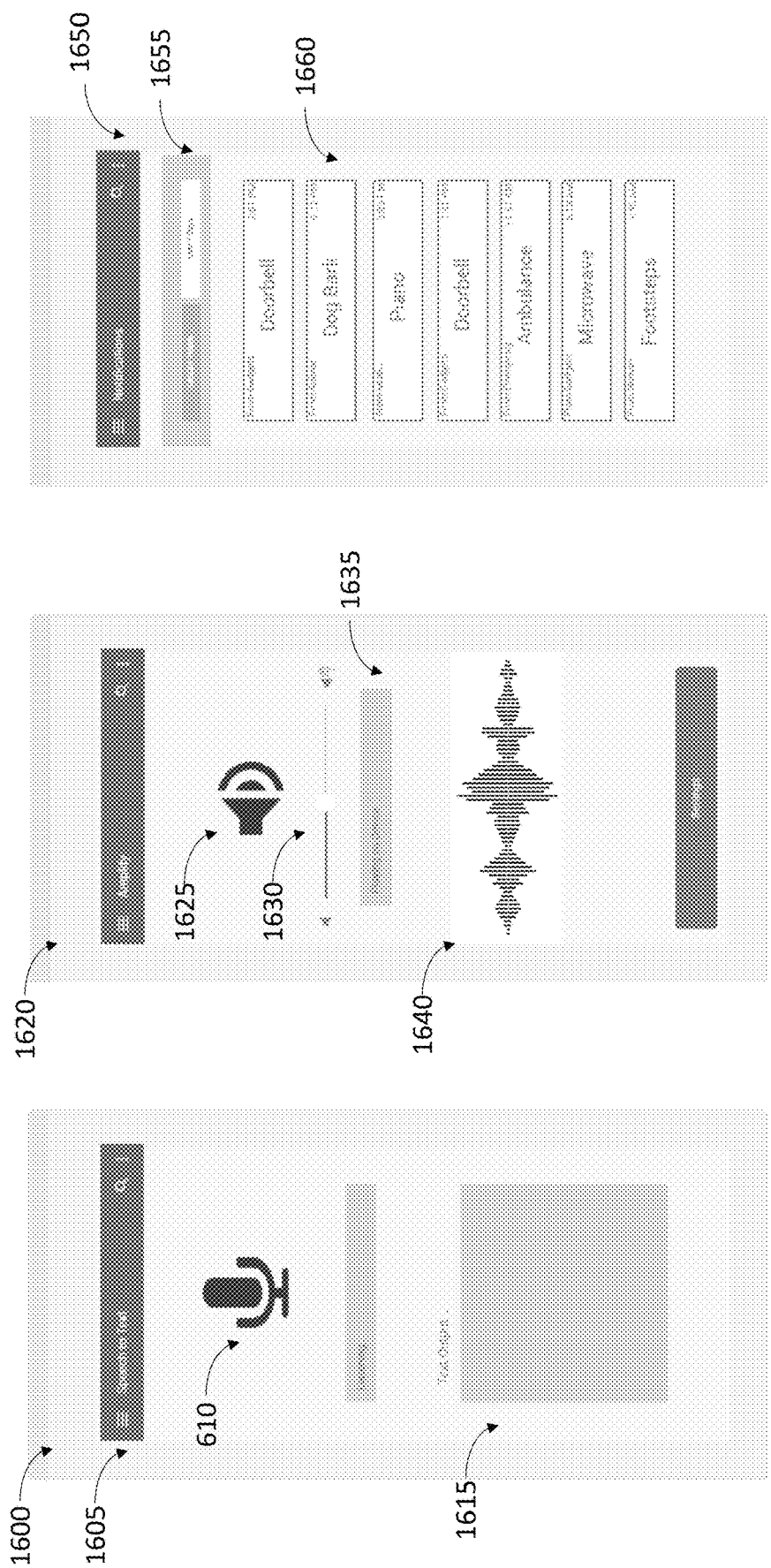

COGNITIVE ASSISTANT FOR REAL-TIME EMOTION DETECTION FROM HUMAN SPEECH

CROSS-REFERENCE TO RELATED APPLICATION(S)

The present disclosure is a continuation-in-part of U.S. patent application Ser. No. 16/747,697, filed Jan. 21, 2020, which is now U.S. Pat. No. 11,189,265, which issues Nov. 30, 2021, the contents of each are incorporated by reference herein in their entirety.

FIELD OF THE DISCLOSURE

The present disclosure generally relates to systems and methods for cognitive assistants to extract emotion from human speech signals. More particularly, the present disclosure relates to machine learning based systems that can be trained on a large dataset of human voice samples to identify human emotions from real-time speech audio.

BACKGROUND OF THE DISCLOSURE

Human beings are very capable of detecting the emotional state of a person by listening to someone's voice. Recognizing emotion does not just rely on the words the person is saying, rather, human beings can recognize the emotional state of the speaker though attributes such as the tone and pitch of the voice. Pets are also capable of recognizing emotion, even though they do not understand the words that are being spoken.

A cognitive assistant that can process human speech in real-time and detect the underlying emotion can have several uses. For example, customer service centers can improve the quality of service they provide by measuring and tracking the emotional state for each call and using that as a performance indicator. Help hotlines can determine the emotional state of callers and respond better. People with autism spectrum disorders often find it hard to recognize and interpret emotion. They can use such assistants to better interact with people around them. Robots designed to help people daily can improve their natural language processing based interactions if they can comprehend emotions better.

BRIEF SUMMARY OF THE DISCLOSURE

In an exemplary embodiment, a system for real-time emotion detection comprises of an audio receiver communicatively coupled to a processing system and a notification system. The processing system obtains audio signals from the audio receiver and first runs signal processing steps to reduce background noise and interference and extract human speech signal. Subsequently, it runs a machine learning based classifier to analyze the human speech signal and classify the emotion observed in it. The user is then notified, based on their preferences, with a summary of the emotion detected. Notifications can be stored in the system for historical viewing. Notifications can also be sent to other systems that have been configured to receive them. Optionally, the system may include the ability to store the speech sample and emotion classification output. The system can also include a speech to text module that can decipher human speech and provide a text transcription of the speech in real-time, with an annotation of the emotion detected. The system's machine learning classifier is periodically trained based on labelled audio data and updated in the system automatically or manually. Methods for training the system are based on machine learning algorithms using deep learning based neural networks.

BRIEF DESCRIPTION OF THE DRAWINGS

The present disclosure is illustrated and described herein with reference to the various drawings, in which like reference numbers are used to denote like system components/method steps, as appropriate, and in which:

FIG. 12 is a mobile device app showing examples of user notifications and interactions.

DETAILED DESCRIPTION OF THE DISCLOSURE

In various embodiments, the present disclosure relates to systems and methods for real-time emotion detection from human speech. The systems and methods may use mobile devices (e.g. iPhone, Android device, tablets, smart watches, etc.) or other digital assistants that can detect and process human sounds, output information, respond to user inputs and store data. They can also be embedded in interactive voice-based systems such as call centers, or digital assistants based on natural language processing such as Amazon Alexa, Apple Siri or Google Home. Examples of human emotions that can be found in speech include calm, happy, sad, angry, fearful, surprise and disgust. The cognitive assistant can process human speech, detect emotion associated with it and generate an appropriate notification.

Figure 1:
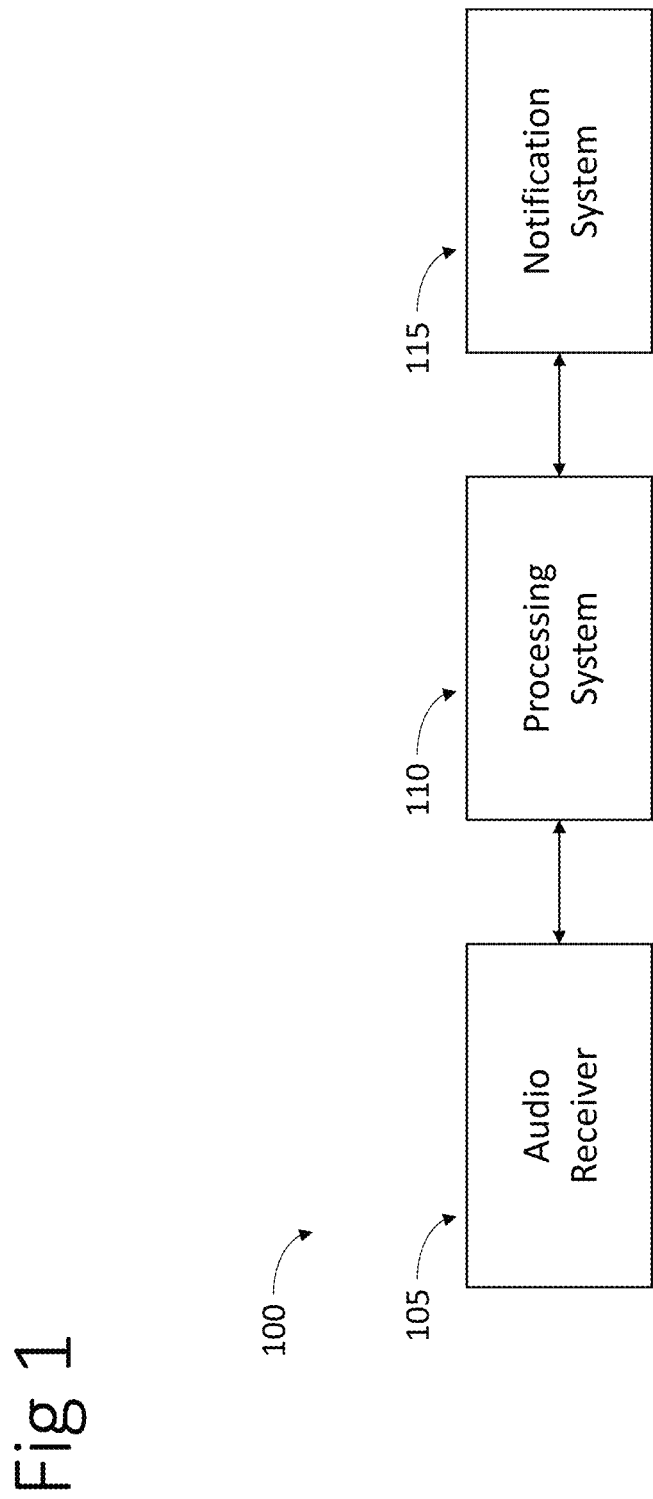
FIG. 1 illustrates a block diagram of a system for detecting emotion from audio signals.

FIG. 1 includes a system 100 which comprises of an audio receiver 105 connected to a processing system 110 connected to a notification system 115. In an example embodiment, the audio receiver 105 could be a microphone (e.g., a microphone on a mobile device or a telephony system) or an external device like Amazon Alexa or Google Home that can capture audio signals, and is coupled with the processing system 110 directly or indirectly. The processing system 110 analyzes the received audio signal to detect and classify emotions, and based on user preferences, send an appropriate notification to the user or another system. In an example embodiment, the processing system could be an application running on the mobile device or a program running in a natural language processing system. The notification system 115 communicates with the user (e.g., through a device notification) or another system (e.g., via an Application Programming Interface).

Figure 2:
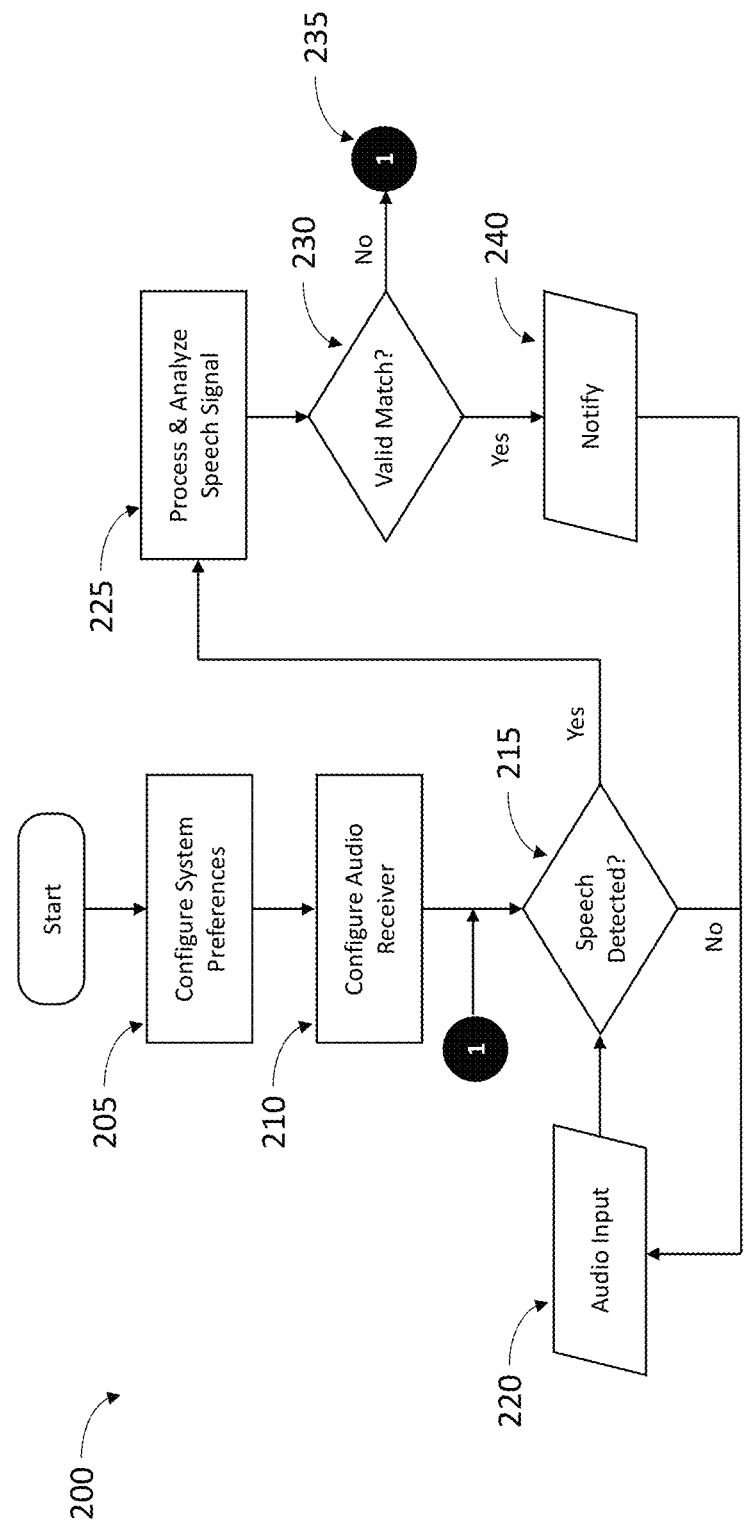
FIG. 2 illustrates a high-level flowchart of the operation of the system of FIG. 1.

FIG. 2 illustrates an overall operational flowchart 200 of an example cognitive assistant. The user configures the system 205 based on their preferences for what, when, and how they would like to be notified. This may be done through user preferences setting on the application software, or in the settings app of a mobile device or configured with hardware buttons on an embedded device. Users can configure their preferences based on what emotions they would like to detect (e.g., happy, angry, fearful, etc.), and they can also configure how notifications are sent (e.g., on a user's screen or as a response to an API call from an external system). In 210, the audio receiver is configured. This requires that the device used to capture the sounds from the environment is activated and able to perform its function. In an example embodiment, if the system is an app on a mobile device, the app must be allowed by the user to access the microphone on the device. Similarly, if the audio input is coming from a device like Amazon Alexa, the system should have proper API access enabled to get the audio inputs. After the system is configured, in 215, it will wait for a human speech signal to be received based on the set preferences. If no interesting signal is received, the system will continuously loop back to the audio receiver until appropriate speech signal in 220 is found. Once a speech signal is received, it is processed and analyzed in 225. This process is further described by FIG. 8. Step 230 checks if the detected emotion matches what was configured in system preferences 205. If a valid criterion is met, a notification is generated in step 240. Note that the system may still log the event, a copy of the speech audio signal, and various processing attributes even though a notification may not have been generated. The system executes the event loop 235 endlessly till the application is terminated.

Figure 3:
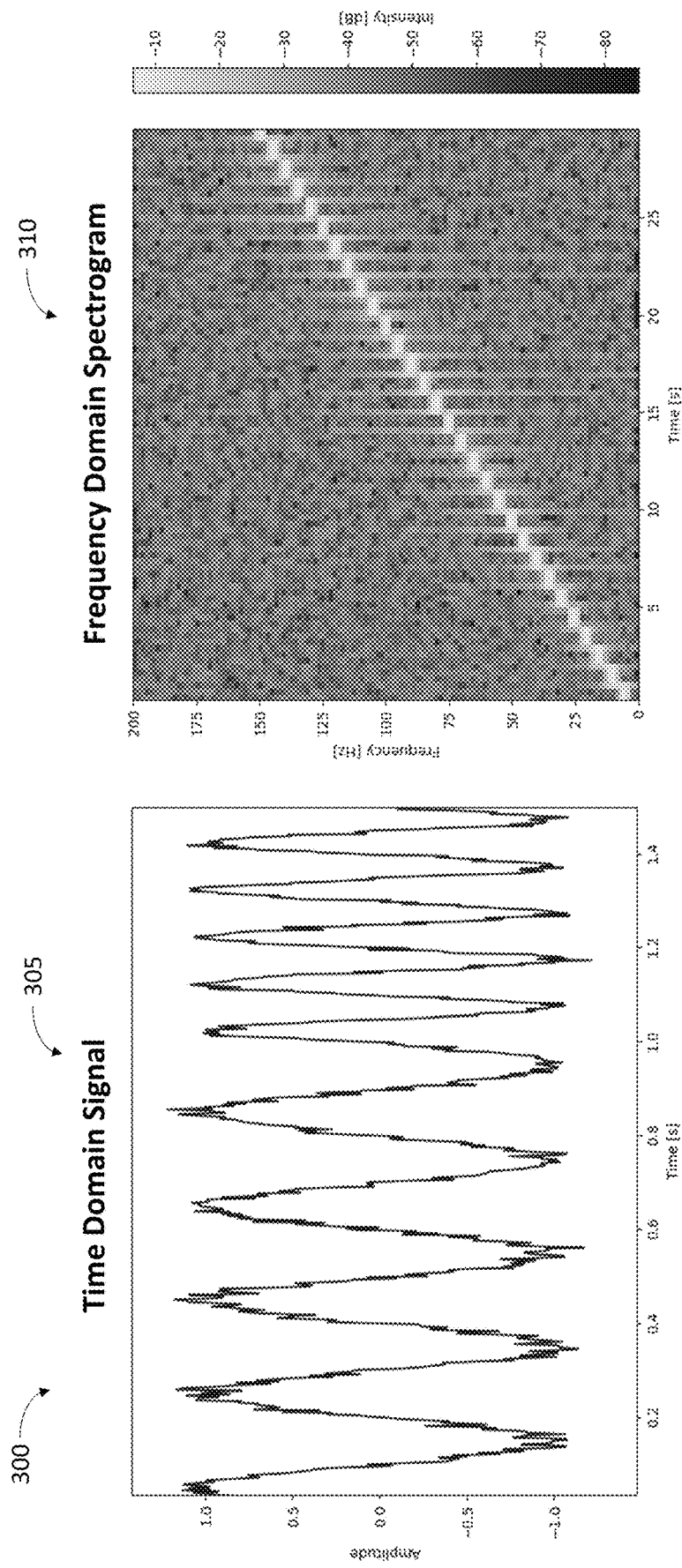
FIG. 3 illustrates a sample time domain signal and its frequency domain spectrogram.

FIG. 3 illustrates a time domain signal 305 and its frequency domain spectrogram 310. Audio signals are a representation of sound that humans perceive. Sound is a vibration that propagates as a wave in a medium such as air or water. Waves are generated when a vibrating source, such as a guitar string or a human vocal cord, creates oscillating pressure changes in a medium which then propagates as a wave, much like a stone dropped into a pond would generate waves that spread out. Sound waves can be captures using a microphone that converts oscillations in the medium to electrical signals. These electrical signals can be digitized using an analog-to-digital converter and represented as well as stored as binary digits.

All waves are characterized by repetitive patterns over time. Repeated patterns are quantified by their frequency, which measures the number of occurrences of the repeating event per unit of time, measured in Hertz (Hz). Higher frequency implies faster repetitions over time and vice versa. Humans can typically perceive audio signals from 20 Hz to 20 kHz range. Digitizing analog audio signals requires sampling them in time and converting it into a discrete sequence of quantized numerical values (Oppenheim, 2014). The Nyquist sampling theorem states that a bandwidth limited continuous-time signal can be perfectly reconstructed from its samples if the waveform is sampled over twice as fast as its highest frequency component. Since humans cannot generally hear signals above 20 kHz, sampling over 40 kHz is sufficient. The most common audio sample rate is 44.1 kHz (Steiglitz, 2020). This is the standard for most consumer audio, used for formats like CDs.

A fundamental concept in signal processing is the Fourier Transform (FT). It stems from a fundamental mathematical fact that any signal can be represented as a sum of an infinite series of sinusoids. FT decomposes a signal into its constituent frequency components. In practical implementations, signals are digitized into discrete samples. Discrete Fourier Transform (DFT) converts a finite sequence of equally spaced samples of a signal into its frequency components.

In the equation below, $x_n$ represents the $n^{th}$ sample of a signal with a total of N samples. $X_k$ represents the amplitude and phase of $k^{th}$ frequency component of the signal. The power spectrum of a signal shows the intensity of all frequency components of the signal, measured by the square of the amplitude, $\|X_k\|^2/N$. The DFT is typically computed over a short window of samples using an efficient Fast Fourier Transform (FFT) algorithm. A typical window could have 1,024 samples. A signal sampled at 44.1 kHz, would have 44,100 samples per second of time which implies that a window of 1,024 samples represents 23 ms of the time domain signal. Overlapping smooth windows are used to remove spurious frequencies that can arise due to sudden truncation of the signal at the end of the window.

$$X_k = \sum_{n=0}^{N-1} x_n e^{-\frac{i2\pi}{N}kn}$$

Using a moving window and FFT, a spectrogram can be generated. A spectrogram is a 3D representation of a signal showings its constituent frequencies over time. In 300 we see a time domain "chirp" signal where frequency is linearly increasing with time. The spectrogram 310 clearly shows the frequency increasing linearly over time. The X-axis represents time, the Y-axis represents frequency and the colormap shows the relative intensity in any time-frequency bin. The spectrogram is generated by using a moving window over the full duration of the signal. Each window of samples is transformed using the FFT to generate frequency components and their relative power. Power is represented on a decibel (dB) logarithmic scale.

Figure 4:
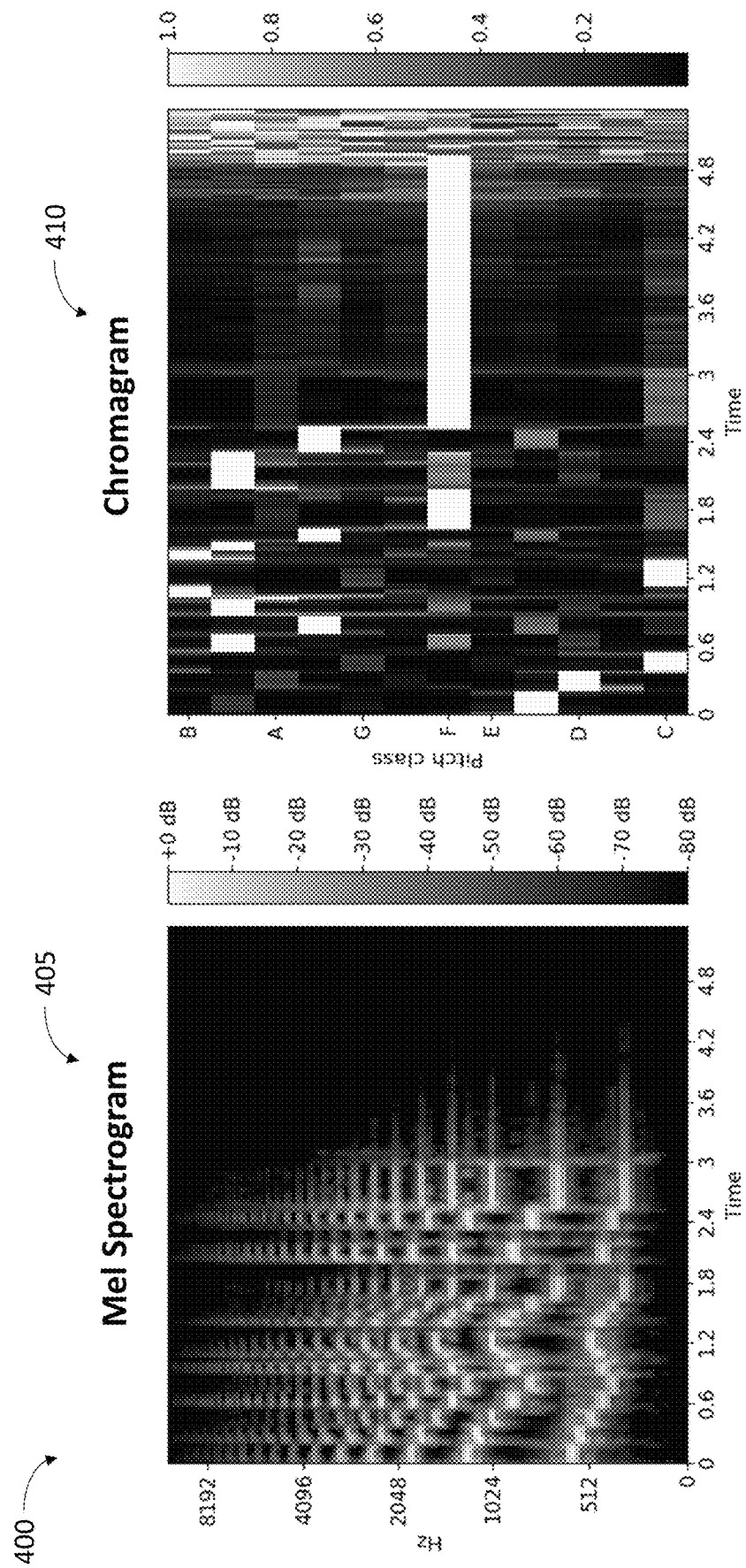
FIG. 4 illustrates the Mel spectrogram and Chromagram of a time domain signal.

FIG. 4 illustrated the Mel spectrogram 405 and the Chromagram 410 of an audio signal. Humans do not perceive frequencies on a linear scale. For example, most people can easily tell the difference between 400 Hz versus 800 Hz sound but will struggle to distinguish a 10,400 Hz signal from a 10,800 Hz signal, although the frequency difference between the two sounds in either case is the same. The Mel (derived from melody) scale was developed to map a linear frequency scale in Hertz to a perceptual scale of pitches judged by human listeners to be equal in distance from one another. The reference point of 1,000 Hz is equivalent to 1,000 Mels. Based on this scale, humans perceive 3,120 Hz as 2,000 Mels and 9,000 Hz as 3,000 Mels. One can see the logarithmic compression of human dynamic range of audio frequency perception. A popular formula to convert frequency in Hz to Mels is as follows.

$$Mel = 2595 \log_{10}\left(1 + \frac{Hz}{700}\right)$$

The Mel spectrogram is a spectrogram representation where frequency is on a Mel scale. Once the power spectrum has been generated for a window of samples, a set of Mel filters is applied to gather the spectral energy in each of the Mel scale frequency bands. Each Mel filter is typically a triangular filter with a value of 1 at the center frequency and decreasing linearly to 0 till it reaches the center frequency on each adjacent side. Typically, a set of 40 such filters are used to extract spectral energy in 40 Mel frequency bins. A Discrete Cosine Transform (DCT) is then applied to the output of the Mel filter bank to remove spurious side-effects of the Mel filters. The final outputs are called Mel Frequency Cepstral Coefficients (MFCC). MFCCs are excellent features to use for audio analysis. Software packages such librosa, a popular python library, are available for audio processing and spectral analysis. Librosa can be used to read/write audio files, extract spectral features such as MFCC, general image plots, and perform other signal processing functions such as filtering, segmentation, and decomposition (McFee, 2015).

Figure 5:
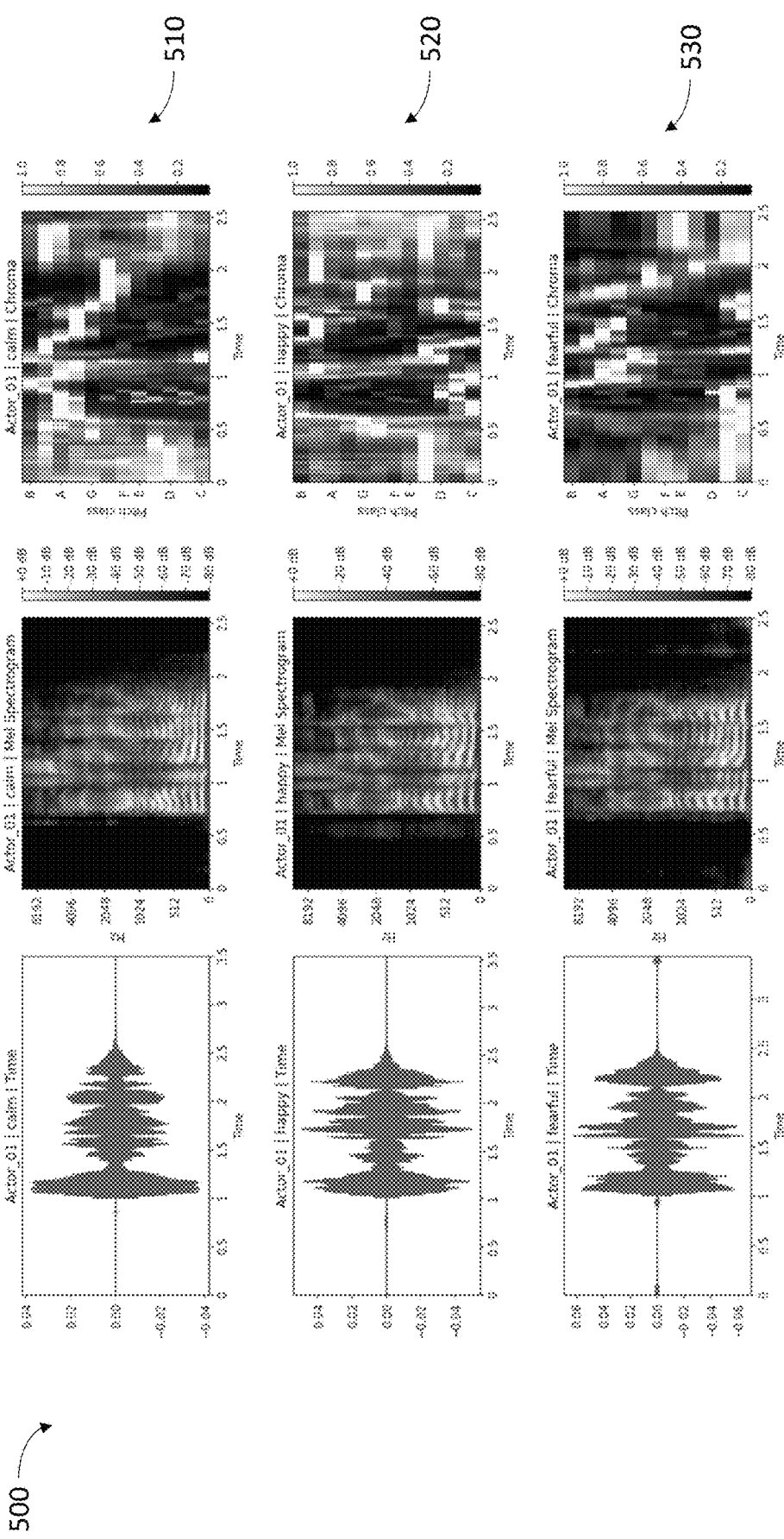
FIG. 5 illustrates a few human speech samples with different emotions and associated time and frequency domain signal features.

FIG. 5 illustrates an example of 3 human speech signals and their associated time domain, Mel spectrogram and Chroma features. The first sample 510 was rendered with a calm emotion, the second 520 with a happy emotion and the third 530 with a fearful emotion. Various time and frequency domain features can be extracted and used by a machine learning classifier to detect associated emotions.

Figure 6:
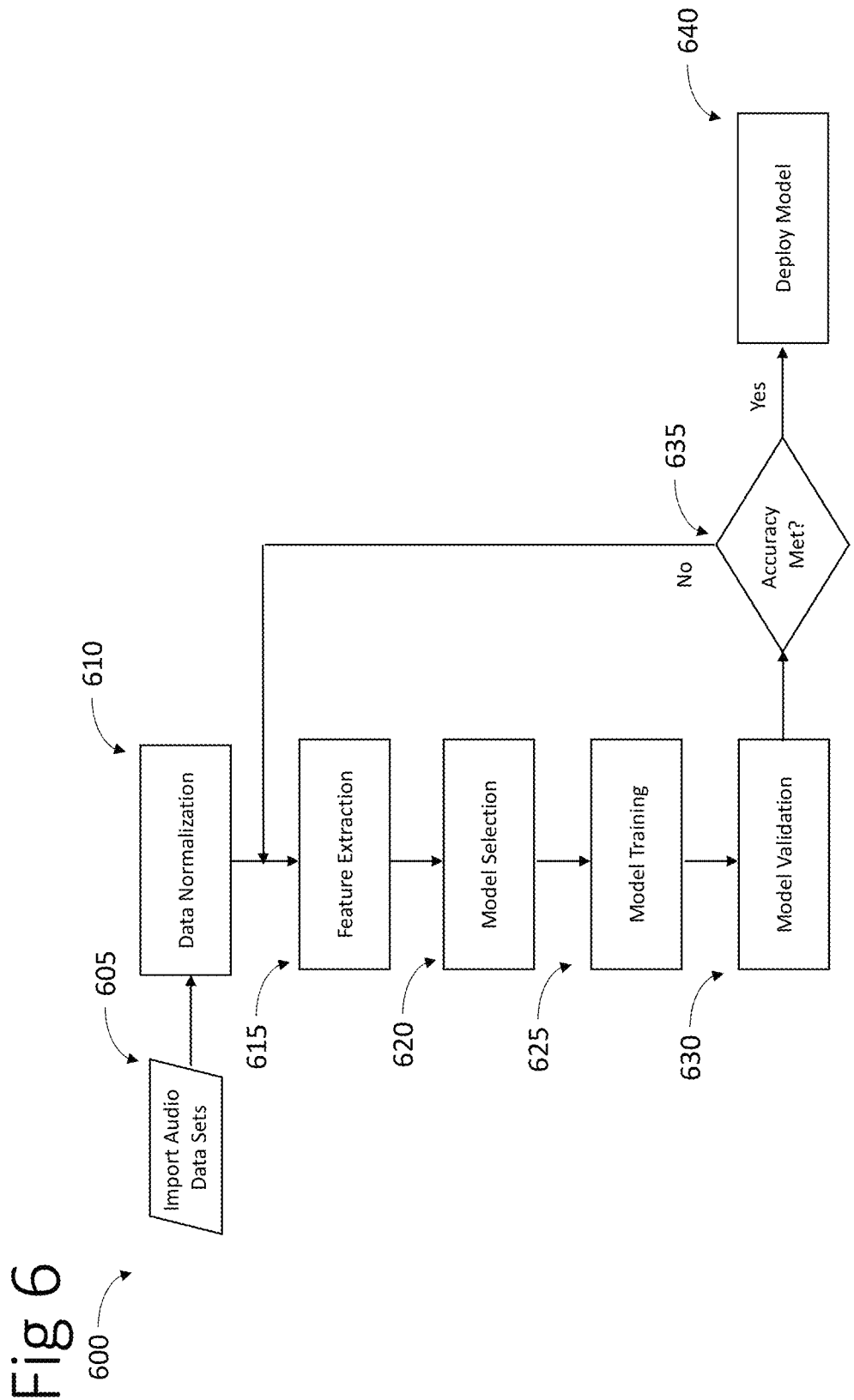
FIG. 6 illustrates a flowchart showing steps to train the Machine Learning (ML) model.

FIG. 6 illustrates the steps involved in training a machine learning classifier. In 605, speech audio data sets including both the training and validation sets is imported. A variety of free and commercial audio data sets are available online. For example, the Ryerson Audio-Visual Database of Emotional Speech and Song (RAVDESS) contains 7,356 files (total size: 24.8 GB). The database contains 24 professional actors (12 female, 12 male), vocalizing two lexically-matched statements in a neutral North American accent (Livingstone, 2018). Speech includes calm, happy, sad, angry, fearful, surprise, and disgust expressions. Each expression is produced at two levels of emotional intensity (normal, strong), with an additional neutral expression. All conditions are available in three modality formats: Audio-only (16 bit, 48 kHz .wav), Audio-Video (720p H.264, AAC 48 kHz, .mp4), and Video-only (no sound). The training and test data is normalized in 610. This process includes developing a consistent format to label and organize audio samples. In 615, features are extracted from the audio set. Examples of features include Mel spectrogram. Step 620 selects a ML model that is likely to perform well with the classification task. This may be as simple as decision trees, regression or k-nearest neighbors, or it could be as advanced as a deep learning neural networks. In 625, the model is trained to classify emotion based on extracted features. A portion of the data set is used for training and the rest is used to validate the model in 630. The process is then repeated in 635 till an acceptable level of model prediction accuracy is reached, based on precision, accuracy, and recall. Once the model is trained, step 640 deploys it to the system described in FIG. 2. The model can periodically be retrained based on the availability of new data sets or user feedback.

Powerful ML models based on Convolutional Neural Networks (CNNs) have been developed for computer vision and image classification. CNNs have been used with spectrograms to successfully extract and classify sound with high accuracy and performance (Piczak, 2015). Long Short-Term Memory (LSTM) is another type of neural network architecture (Hochreiter, 1997). LSTM networks are Recurrent Neural Networks (RNN) that use inputs over a period that may be related to map them to outputs. Deep neural networks that combine LSTM and CNN models have also been studied. LSTM networks are efficient at learning temporal dependencies. They have been used in natural language processing applications where a sentence has a sequence of spoken words that are related and therefore must be considered when translating speech to text. LSTMs have been used for as phoneme classification, speech recognition and speech synthesis (Graves, 2013). LSTM network combined with CNN was also successfully used for video classification (Yue-Hei Ng, 2015). LSTM networks have been shown to be effective in classifying urban sounds (Lezhenin, 2019).

Figure 7:
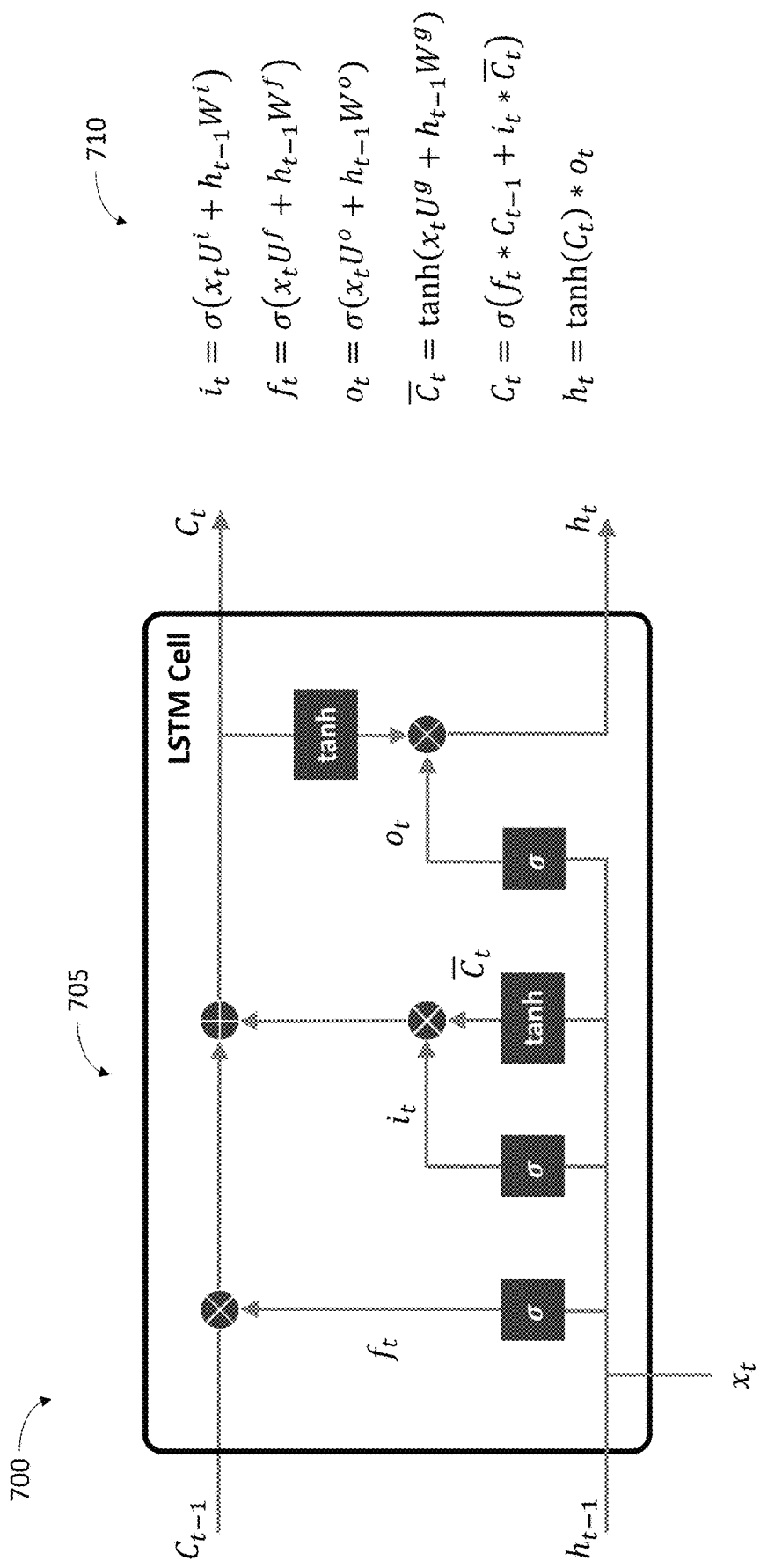
FIG. 7 illustrates a Long Short-Term Memory (LSTM) based neural network used in natural language processing.

Unlike a standard feedforward neural network, LSTM have feedback connections. This allows it to process not only single data snapshots (e.g., images), but also entire sequences of snapshots of data (e.g., speech and video). This makes LSTM very applicable to problem such as handwriting recognition, natural language processing, and time series anomaly detection. At the heart of an LSTM network is an LSTM cell as shown in FIG. 7. It has an input gate, $i_t$, an output gate, $o_t$, and a forget gate, $f_t$. The subscript t indicates a time step. At any time step t, the cell processes the input vector, $x_t$, and computes various activation vectors as illustrated by the system of equations in 710. Matrices W and U are weights and biases that are learned during training, while σ refers to the standard sigmoid activation function. The cell remembers values over arbitrary time intervals and the three gates regulate the flow of information into and out of the cell.

Figure 8:
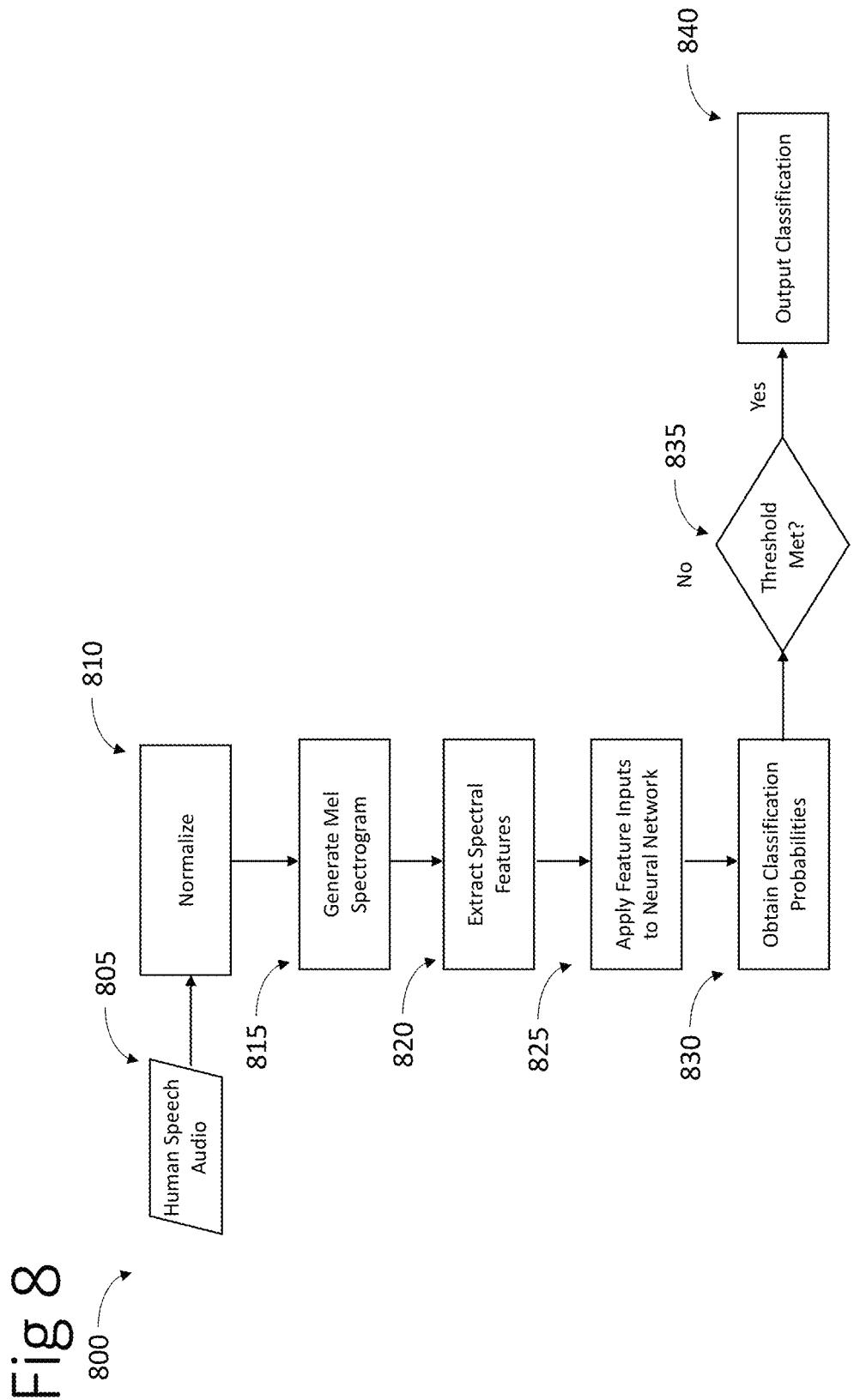
FIG. 8 illustrates a flowchart of processing steps of the ML based classifier for detecting emotion associated with the speech audio signal.

FIG. 8 demonstrates the core processing and analysis steps used by a neural network based emotion classifier. In 805 the speech audio signal to be processed is isolated from other background noises. Generally, this would mean that a valid speech signal above the noise threshold has been received. The received signal is normalized in 810 to have sampling rates, time window and samples that are consistent with what was used to train the model. Step 815 generates the Mel spectrogram of the input speech signal. Step 820 extracts spectral features that were used in the model training from the spectrogram. These could me MFCCs, chroma, etc. The feature vector is applied as input to the neural network in 825 and emotion classes with associated probabilities are obtained in 830. If the detection probability for an emotion exceeds a configured threshold in 835, it is sent as output in 840.

Figure 9:
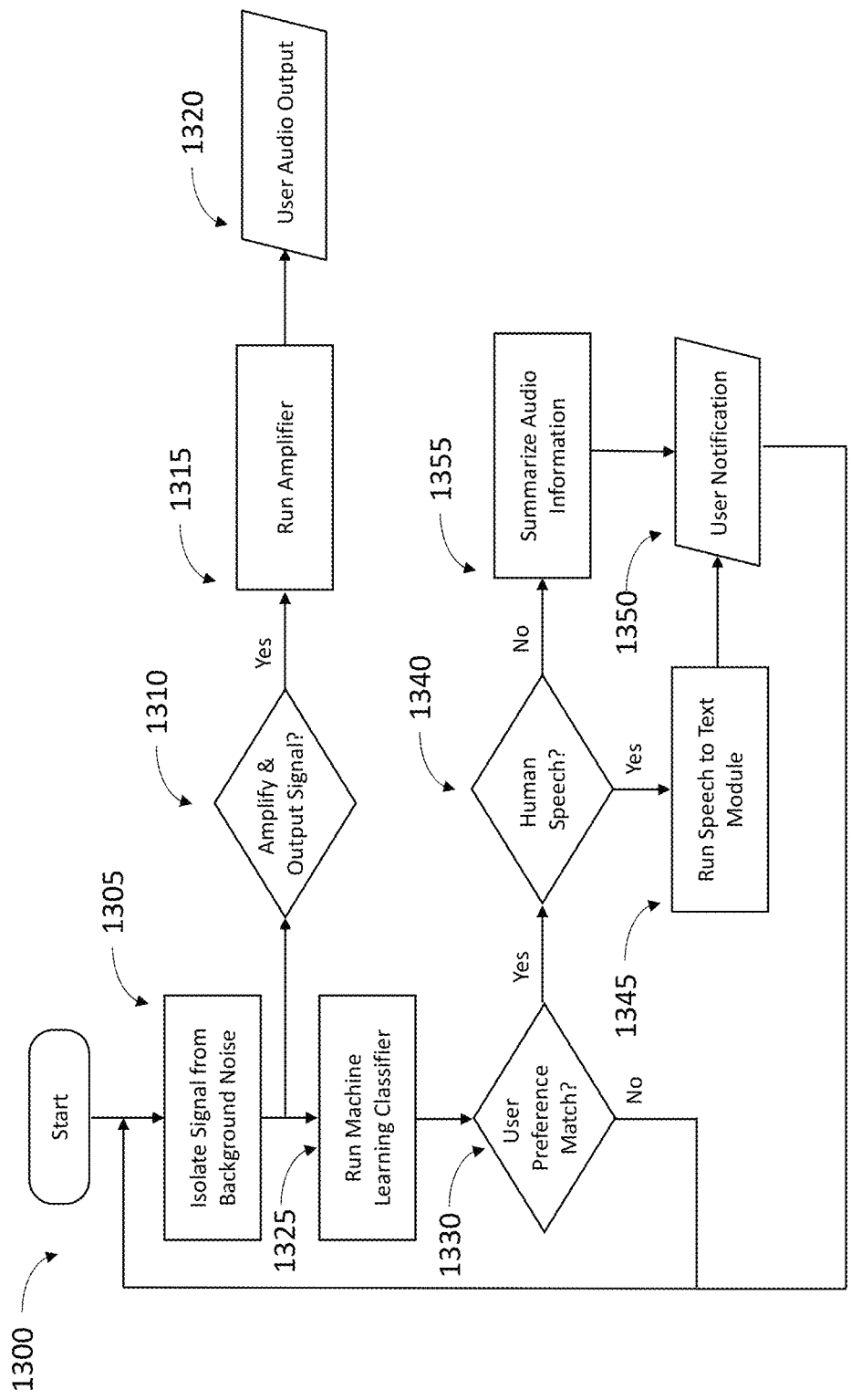
FIG. 9 is a high-level flowchart of the analysis and processing steps that capture ambient sound signals and notify the hearing-impaired user based on preferences.

FIG. 9 demonstrates the core processing and analysis steps. In 1305 the audio signal to be processed is isolated from other background noises. Generally, this would mean that a valid audio signal above the noise threshold has been received. The received signal is run through digital signal processing filters that improve the fidelity and quality of the received sound, to assist downstream processing and detection. Once the sound has been isolated and filtered, step 1310 checks to see if the user wants the specific sound to be amplified and sent to them. If it is, 1315 will run the amplifier which will increase the audio signal strength and condition it so that it can be easily perceived by individuals experiencing hearing loss. In 1320, the improved sound will be outputted to the user through their listening device (e.g. headset). A copy of the audio signal may also be stored digitally. If the user is completely void of hearing and needs the sound to be communicated to them in another way, or if the user wants the system to detect and notify regardless, it will then have to be classified into a specific category so that eventually the sound can be identified. Step 1325 runs the machine learning classifier which takes the audio signal as input and outputs a most likely audio category (e.g. Animal Sounds, Emergency, Devices, Vehicles, Speech, Music, etc.) and specific audio type (e.g. Dog Barking, Ambulance Siren, Telephone Ring, Garbage Truck, English Conversation, Piano, etc.) that matches a pre-determined set of audio categories and types that the model has been trained to identify. Once audio category and type is determined, step 1330 checks whether the user cares to be notified about the detected audio category and type based on preferences set before. If not, the system goes back to step 1305 where it tries to collect new audio samples for analysis. If the user does want to be notified of the sound, the system checks if the determined category was human speech in 1340. If so, it proceeds to 1345 where it runs the speech to text module which extracts text from the human voice signal and sends it to the notification system 1350. If it is not human speech, the audio information is summarized in 1355 and the summary is sent to the notification system 1350. For example, the system may have detected audio type Ambulance Siren of category Emergency. That information, along with the date, time duration and other relevant information may be sent to the user's notification system (e.g. a mobile phone alert).

Figure 10:
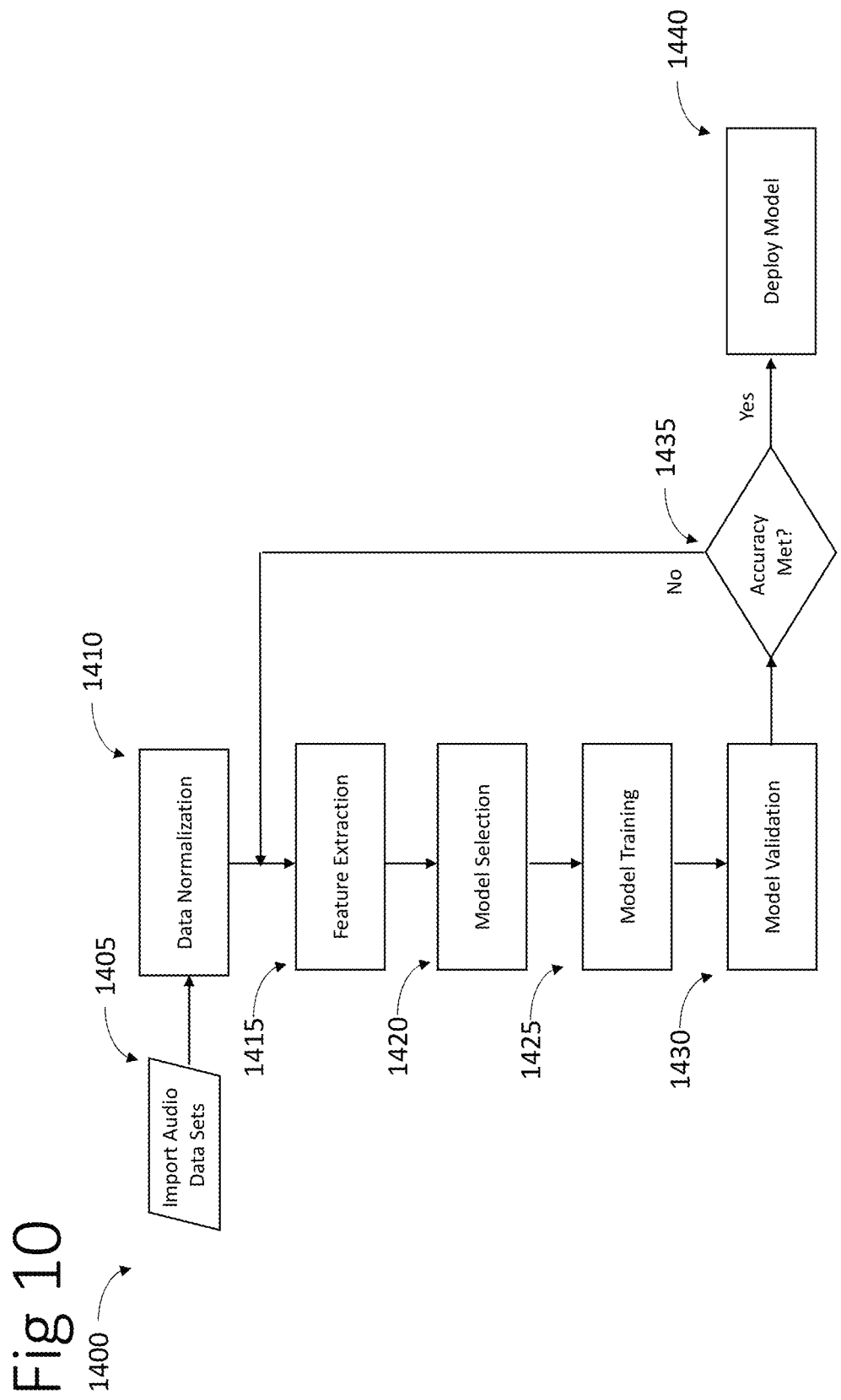
FIG. 10 is a flowchart of the method used to train the machine learning model to classify sounds.

FIG. 10 represents the steps used to train the machine learning classifier 1325. In 1405, audio data sets including both the training and validation sets is imported. A variety of free and commercial audio data sets are available online. For example, Google AudioSet (Gemmeke, 2017) is collection of roughly 2.1 million audio clips, each 10 seconds long, extracted and labelled from YouTube. Similarly, the UrbanSound8K dataset (Salamon, 2014) contains over 8,000 labeled sound files each approximately 4 seconds long and of sounds encountered in a typical urban environment and labelled into 10 classes. The FSD project uses crowd-sourcing of annotations of audio samples from Freesound organised using the AudioSet framework (Fonseca, 2019). Data sets can also be generated manually by recording sounds and labeling them. This data is then normalized in 1410. This process includes developing a consistent format to label and organize audio samples. In 1415, features will then be extracted from the audio set. For example, differences in frequency, pitch, tone, intensity, etc. can be used to distinguish between different audio samples. Step 1420 selects the model that best classifies and trains the data set using data science principles. This may be as simple as decision trees, regression or k-nearest neighbors, or it could be as advanced as a deep learning neural network. In 1425, the model is trained to classify audio samples to appropriate category and type based on extracted features. A portion of the data set is used for training and the rest is used to validate the model in 1430. The process is then repeated in 1435 till an acceptable level of model prediction accuracy is reached, based on precision, accuracy, and recall. Once the model is trained, step 1440 deploys it to the system described in FIG. 9. The model can periodically be retrained based on the availability of new data sets or user feedback.

Figure 11:
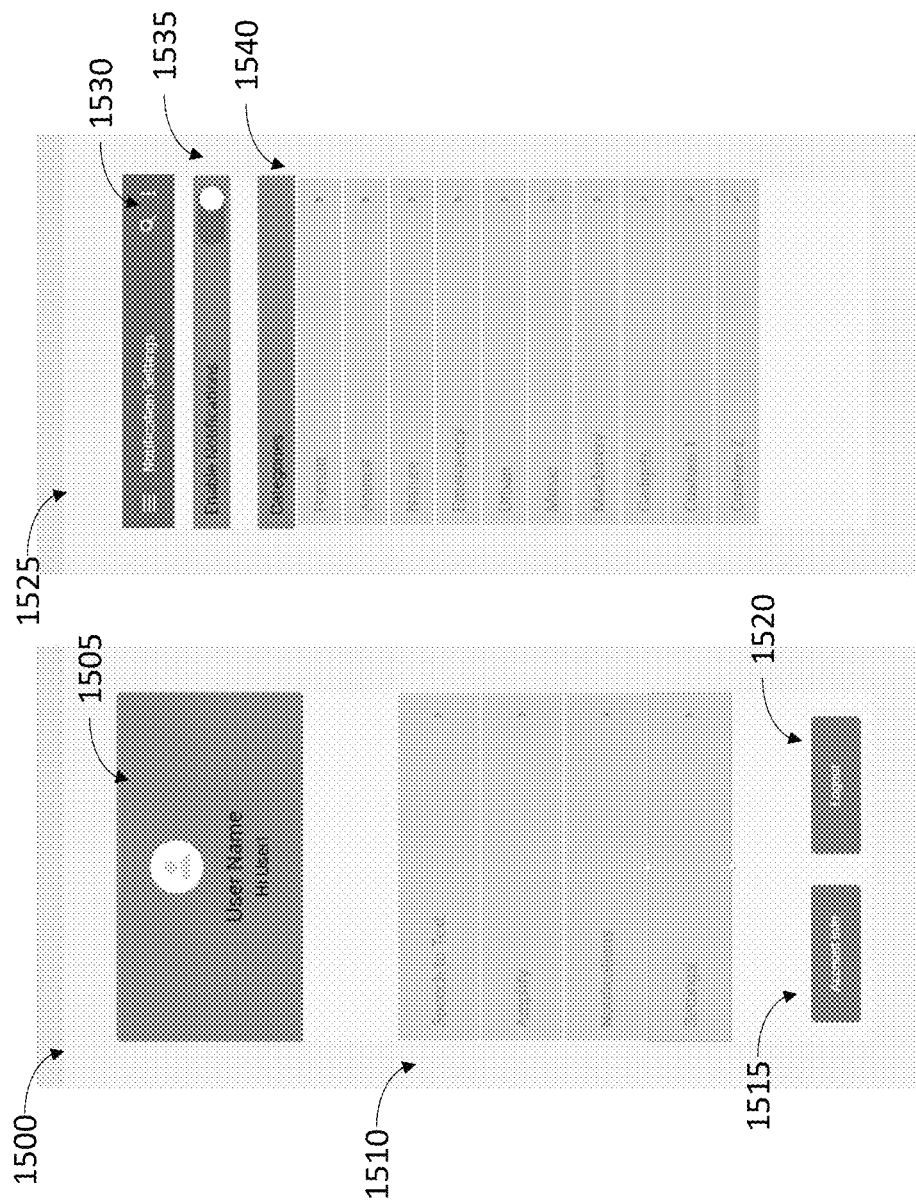
FIG. 11 is a mobile device app showing examples of user configuration options.

FIG. 11 illustrates an example embodiment of the user's view of the system. It includes a sample 1500 of the home screen of the user's interface, and an example of a settings page 1530 that can be integrated into a mobile application. 1505 displays a brief summary of the user's profile including a portrait of them and their name. This shows that they are logged into their profile and ensures that the application is running with their configured preferences. 1510 illustrates four main functions of the application—speech to text, amplifier, notifications, and settings. FIG. 12 describes these functions. In 1515, the user can click to view or update their account information. This may include their profile, account settings, as well as other important information that pertains to their condition so the system can cater to those needs. 1520 allows the user to logout of their account. This may be useful if they want to temporarily disable the system, or if they wish to switch to another user's account with different settings (e.g. a shared device in school). 1530 exemplifies a sample of the settings page of the user's system. 1535 allows them to choose whether they want to allow notifications to be outputted on their device. If the switch is on, notifications will be sent to the user each time one of their preferred sounds is detected. If it is off, no notifications will be sent to the user although data will continue to be collected and stored. 1540 exhibits sample categories the user may prefer to be notified of. For example, if they wish to be notified of any Animal Sounds, they choose that Animal Sounds category and specify specific audio types (e.g. Dog Barking) or all audio types in the category. The system could also provide feedback to the application developer to improve model training based on frequently requested categories.

FIG. 12 is an example embodiment of the user's interactions with the system. 1600 represents one of the functions of the system-speech to text conversion. This can be used to convert human speech into text. 1605 is the menu bar that can be found on each page. By pressing the three horizontal bars, the user will be returned to the home screen 1500. Similarly, the search icon after it can be used to search for anything in the system, and the three dots allows the user to customize specific settings for each page (e.g. language, volume, etc.). If the microphone icon 1610 is pressed, the message "Listening . . . " will be presented to show the system is activated. It will continue to show this message until 1610 is pressed again to stop transcribing the audio signal. As the speech is being captured, its text will be transcribed in real-time in the text-box 1615. 1620 shows the amplifier feature of the system. Similar to 1610, when the speaker icon 1625 is selected, it will activate the amplifier. The user can adjust what volume they want the sound to be amplified to using the slider 1630. While the amplifier is running, the message 1635, "Playing on Device . . . " or another similar message will be outputted so the user knows that it is properly functioning. When the sound is amplified and is being played back, 1640 depicts an animation of the time domain samples of the sound waves as it is being played back. 1650 is a sample of the notifications page of the application. 1655 allows the user to view past notifications from the last 24 hours, or from the last 7 days, for example. 1660 is an example embodiment of notifications that might be sent to the user. It includes the category of the notification (e.g. Animal Sounds, Emergency, Devices, Vehicles, Speech, Music, etc.), specific audio type (e.g. Dog Barking, Ambulance Siren, Telephone Ring, Garbage Truck, English Conversation, Piano, etc.) and time when the alert was generated.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

REFERENCES

R. Oppenheim, A. Schafer, *Discrete Time Signal Processing*, 2014.

K. Steiglitz, *A Digital Signal Processing Primer: with Applications to Digital Audio and Computer Music*, 2020.

B. McFee, C. Raffel, D. Liang, D. Ellis, M. McVicar, E. Battenberg, and O. Nieto, "librosa: Audio and music signal analysis in python." In Proceedings of the 14th Python in Science Conference, p. 18-25, 2015.

S. Livingstone, F Russo, The Ryerson Audio-Visual Database of Emotional Speech and Song (RAVDESS): A dynamic, multimodal set of facial and vocal expressions in North American English. PLoS ONE 13(5): e0196391, 2018.

K. J. Piczak, "Environmental sound classification with convolutional neural networks," 2015 IEEE 25th International Workshop on Machine Learning for Signal Processing (MLSP). IEEE, p. 1-6, 2015.

S. Hochreiter and J. Schmidhuber, "Long short-term memory," Neural Computation, p. 1735-1780, 1997.

A. Graves, A. Mohamed, and G. Hinton, "Speech recognition with deep recurrent neural networks," in 2013 IEEE international conference on acoustics, speech and signal processing. IEEE, p. 6645-6649, 2013.

J. Yue-Hei Ng, M. Hausknecht, S. Vijayanarasimhan, O. Vinyals, R. Monga, and G. Toderici, "Beyond short snippets: Deep networks for video classification," in Proceedings of the IEEE conference on computer vision and pattern recognition, p. 4694-4702, 2015.

I. Lezhenin, N. Bogach, and E. Pyshkin, "Urban Sound Classification using Long Short-Term Memory Neural Network," in Proceedings of the Federated Conference on Computer Science and Information Systems, p. 57-60, 2019.

What is claimed is:

1. A system comprising:
   an audio receiver;
   a processing system connected to the audio receiver;
   a notification system connected to the processing system,
   wherein the processing system is configured to
   i) obtain audio signal from the audio receiver;
   ii) process the audio signal to detect if human speech is present;
   iii) responsive to the audio signal containing human speech, run a machine learning based classifier to analyze the speech audio signal and output an emotion detected in speech, wherein the detected emotion is one of calm, happy, sad, angry, fearful, surprise, and disgust;
   v) send the emotion detected to a notification system;
   vi) loop back to i),
   wherein the machine learning classifier is periodically trained externally based on labelled audio sample data and updated in the system, and wherein the processing system is further configured to
   receive feedback from a user that the detected emotion was incorrect or unknown, and
   process the feedback for the labelled audio sample data.

2. The system of claim 1, wherein the processing system has a filter and an amplifier to output an improved copy of the received audio signal or store it digitally.

3. The system of claim 1, wherein the notification system is a mobile device push notification configured by the user.

4. The system of claim 1, wherein the notification system responds to an API request from an external system.

5. The system of claim 1, wherein notification preferences are configured by the user.

6. The system of claim 1, where the system is running as an application on a mobile device, wherein the audio receiver is a microphone on the mobile device, the processing system is a processor on the mobile device and the notification system is a screen and vibration alerts.

7. The system of claim 1, wherein the audio receiver is a separate device communicatively coupled to the processing system running on a computer.

8. A method comprising:
   i) obtaining audio signal from an audio receiver;
   ii) processing the audio signal to detect if human speech is present;
   iii) responsive to the audio signal containing human speech, running a machine learning based classifier to analyze the speech audio signal and output an emotion detected in speech, wherein the detected emotion is one of calm, happy, sad, angry, fearful, surprise, and disgust;
   v) sending the emotion detected to a notification system;
   vi) looping back to i),
   wherein the machine learning classifier is periodically trained externally based on labelled audio sample data and updated in the system, and wherein the method further comprises
   receiving feedback from a user that the detected emotion was incorrect or unknown, and processing the feedback for the labelled audio sample data.

9. The method of claim 8, further comprising of a filter and an amplifier to output an improved copy of the received audio signal or store it digitally.

10. The method of claim 8, wherein the notification method is a mobile device push notification configured by the user.

11. The method of claim 8, wherein the notification method responds to an API request from an external system.

12. The method of claim 8, wherein the notification method can be configured by the user.

13. A non-transitory computer-readable medium comprising instructions that, when executed, cause a processing system to perform steps of:
- i) obtaining audio signal from an audio receiver;
- ii) processing the audio signal to detect if human speech is present;
- iii) responsive to the audio signal containing human speech, running a machine learning based classifier to analyze the speech audio signal and output an emotion detected in speech, wherein the detected emotion is one of calm, happy, sad, angry, fearful, surprise, and disgust;
- v) sending the emotion detected to a notification system;
- vi) looping back to i), wherein the machine learning classifier is periodically trained externally based on labelled audio sample data and updated in the system, and wherein the steps further comprise
  receiving feedback from a user that the detected emotion was incorrect or unknown, and
  processing the feedback for the labelled audio sample data.

* * * * *